Patented June 5, 1951

2,555,798

UNITED STATES PATENT OFFICE 2,555,798

PURIFICATION OF ACRYLONITRILE BY STEAM DISTILLATION

Edward L. Kropa, Old Greenwich, Conn., assignor to American Cyanamid Company, New York, N. Y., a corporation of Maine No Drawing. Application June 21, 1945, Serial No. 600,849

4 Claims. (Cl. 202—46)

This invention relates to the purification of acrylonitrile. More particularly, the invention relates to the purification of acrylonitrile by removal of impurities through the medium of a non-volatile polybasic inorganic acid. The purified acrylonitrile is especially adapted to polymerization or copolymerization processes where improved products are desired.

In the production of acrylonitrile, the crude products contain numerous impurities which are removed in varying degrees by several methods. Among the principles employed to bring about such purification are: fractionation, adsorption, use of selective solvents, and halogenation of impurities. When acrylonitrile is subjected to polymerization or copolymerization with a view to obtaining colorless products, the commonly used purification processes are inadequate in that invariably a discoloration occurs. Normally the acrylonitrile is not used immediately after the purification, and a period of time is required to transport the material from a place of production to a place of consumption, or the purified product is stored to await shipment. It is therefore often necessary or desirable to use an inhibitor to prevent polymerization. The complete removal of the inhibitor prior to a polymerization or copolymerization process is often desirable, but difficulties of complete removal of some types of inhibitors are frequently encountered. A discolored product may be obtained and, furthermore, the presence of traces of inhibitors influence the rate of polymerization. The rate of polymerization or copolymerization in turn affects the nature of the polymerized or copolymerized product. By controlling the degree of purity of acrylonitrile, one is thus enabled to control the nature of a polymer produced therefrom and thereby uniform results prevail. Furthermore, the rate of the polymer formation has an effect on the molecular weight and also on the molecular weight distribution, which influences the nature of the polymer. It is, therefore, highly desirable to utilize a method whereby acrylonitrile may be efficiently purified with uniform results. The present invention, in addition to yielding a highly pure acrylonitrile, yields higher proportions of the pure compound based on the crude material. For example, the use of an ordinary fractionation method yields some fractions which are not sufficiently purified and therefore they must be reprocessed with a consequent result of decrease in total yield.

An object of this invention is to provide an improved method for the purification of acrylonitrile.

Another object of this invention is to produce improved polymers or copolymers by the use of pure acrylonitrile.

These and other objects are attained as herein described.

It has been found that acrylonitrile can be efficiently purified by steam-distilling over a non-volatile polybasic inorganic acid, preferably phosphoric acid. This method of purification may be applied to crude acrylonitrile or it may be used to enhance the purity of acrylonitrile which had been previously subjected to purification processes, such as treatment with bauxite. The method is also adaptable to removing inhibitors or stabilizers from acrylonitrile prior to its use in a polymerization or copolymerization process.

The amount of a non-volatile polybasic inorganic acid used may vary considerably depending on the amounts of impurities present in the acrylonitrile. For most purposes, from about 1% to about 10% of the acid based on the weight of acrylonitrile gives good results. When an extremely impure batch of acrylonitrile is encountered, it may be advantageous to first subject the impure acrylonitrile to washing with an aqueous solution of a non-volatile polybasic inorganic acid followed by steam distillation over a small amount of such an acid. The non-volatile polybasic inorganic acid not only removes the impurities, but apparently acts as an inhibitor as evidenced by a total absence of polymerization or other form of reaction during the process of distillation. Non-volatile polybasic inorganic acids which are suitable to use in the present process are, for example, phosphoric and sulfuric acids.

Anion active resins, sometimes called anion exchange resins and cation exchange materials may be used to purify the acrylonitrile either before or after the distillation treatment with phosphoric acid if desired. For this purpose any of the known anion active resins or any of the known cation exchange materials may be employed. Furthermore, the acrylonitrile may be passed through one or more series of beds of cation active material and anion active material and in some cases acrylonitrile may be sufficiently purified by the use of the anion active resins so that further purification with phosphoric acid and/or distillation with phosphoric acid may not be required. Generally however, the purification is greatly improved by the use of steam distillation of the acrylonitrile over phosphoric acid or over some other non-volatile inorganic polybasic acid. Further, it is preferable that the steam distillation over phosphoric acid or the like, be used after any preliminary purification such as by means of bauxite, ion active materials or mere acid treatment.

Polymers or copolymers resuling through the use of acrylonitrile purified as stated herein may be advantageously used in the treatment of textiles, coating compositions, and plastics in general where clearness and uniformity are desired properties. The purified acrylonitrile is also preferred in preparing polymerization products where the nature of the polymer is required to have uniform properties.

This application is a continuation-in-part of a copending application, Serial No. 475,792, filed February 13, 1943, now Patent No. 2,446,049, which is a continuation-in-part of application Serial No. 391,712, filed May 3, 1941 now Patent No. 2,310,961.

The following examples are given for the purpose of illustration and not in limitation. Variations may be made without departing from the spirit and scope of the present invention. The term "parts" as used herein indicates "parts by weight" unless otherwise stated.

EXAMPLE 1

A still is charged with 4000 parts of crude acrylonitrile, 890 parts of water, and 210 parts of 85% phosphoric acid. The mixture in the still is heated externally to about 100° C. in order to prevent excessive condensation upon subsequent introduction of steam. The mixture is steam-distilled, yielding a water-white distillate. The wet acrylonitrile may be separated from the water by any suitable means.

EXAMPLE 2

About 6000 parts of crude acrylonitrile are charged to a still together with about 1335 parts of water and about 320 parts of 85% phosphoric acid. The mixture is steam distilled yielding a water-white distillate. When the acrylonitrile is to be polymerized it may be separated from the water, or, if it is to be polymerized in emulsions or dispersions it may be emulsified or dispersed in the water by the addition of suitable emulsifiers or dispersing agents. Thereafter, upon heating the acrylonitrile or subjecting it to other polymerizing conditions it polymerizes readily to give high quality resinous polymers or it may be copolymerized to give excellent products such as synthetic rubber-like materials.

Test 1

2386 parts of isopropenyl toluene
795 parts of acrylonitrile, purified as in Example 1
352 parts of methyl acrylate These substances are heated together under reflux for about 17 hours, and the resulting viscous syrup is cast and maintained at 85° C. for 13 days. The resulting casting is crystal clear.

The resin is broken up and cut by impact. The resulting molding compound is injection molded at a temperature of 365° F. and a pressure of 33,000 pounds per square inch. The moldings are clear and colorless.

Test 2

445 parts of dimethyl styrene
248 parts of acrylonitrile, purified as in Example 1
68.5 parts of a 10% solution of polyvinyl alcohol
1990 parts of water The above substances are heated at about 85° C. for about 5 days. The copolymer is filtered and treated with water and 75% aqueous methanol. Upon drying, the product is crystal clear.

I claim:

1. A process for the purification of acrylonitrile comprising steam distilling a mixture of acrylonitrile and a non-volatile polybasic inorganic acid selected from the group consisting of phosphoric acid and sulfuric acid.

2. A process for the purification of acrylonitrile comprising steam-distilling a mixture of acrylonitrile and phosphoric acid.

3. A process for the purification of acrylonitrile comprising steam-distilling a mixture of acrylonitrile and 1 to 10% of a non-volatile polybasic inorganic acid selected from the group consisting of phosphoric acid and sulfuric acid based on the weight of the impure acrylonitrile.

4. A process for the purification of acrylonitrile comprising bringing the acrylonitrile into intimate contact with phosphoric acid followed by distillation of the acrylonitrile.

EDWARD L. KROPA.

REFERENCES CITED

The following references are of record in the file of this patent:

UNITED STATES PATENTS

| Number | Name | Date |
|---|---|---|
| 2,175,805 | Jacobson | Oct. 10, 1939 |
| 2,190,287 | Hershberger | Feb. 13, 1940 |
| 2,247,255 | Senkus | June 24, 1941 |
| 2,361,367 | Davis | Oct. 21, 1944 |
| 2,375,015 | Marple | May 1, 1945 |